US012103802B2

(12) United States Patent
Kondou et al.

(10) Patent No.: US 12,103,802 B2
(45) Date of Patent: Oct. 1, 2024

(54) MEDIUM PROCESSING DEVICE AND MEDIUM TRANSACTION DEVICE

(71) Applicant: Oki Electric Industry Co., Ltd., Tokyo (JP)

(72) Inventors: Naoto Kondou, Tokyo (JP); Takamoto Yokote, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 318 days.

(21) Appl. No.: 17/532,560

(22) Filed: Nov. 22, 2021

(65) Prior Publication Data

US 2022/0081246 A1 Mar. 17, 2022

Related U.S. Application Data

(63) Continuation-in-part of application No. PCT/JP2020/015710, filed on Apr. 7, 2020.

(30) Foreign Application Priority Data

May 29, 2019 (JP) ................................ 2019-100334

(51) Int. Cl.
*B65H 29/51* (2006.01)
*B65H 75/44* (2006.01)
*G07D 11/14* (2019.01)
*G07D 11/16* (2019.01)
*G07D 11/26* (2019.01)

(52) U.S. Cl.
CPC ......... *B65H 29/51* (2013.01); *B65H 75/4402* (2013.01); *G07D 11/14* (2019.01); *G07D 11/16* (2019.01); *G07D 11/26* (2019.01); *B65H 2515/70* (2013.01); *G07D 2211/00* (2013.01)

(58) Field of Classification Search
CPC ................ B65H 2301/5133; B65H 2301/5321
See application file for complete search history.

(56) References Cited

U.S. PATENT DOCUMENTS

| | | | | |
|---|---|---|---|---|
| 9,150,375 | B2 * | 10/2015 | Arikata | B65H 5/068 |
| 9,595,154 | B2 * | 3/2017 | Takada | B65H 29/006 |
| 2001/0022258 | A1 * | 9/2001 | Satou | B65H 29/006 194/206 |
| 2015/0014469 | A1 | 1/2015 | Watsuki | |
| 2019/0356115 | A1 * | 11/2019 | Yamakawa | B65H 20/02 |

FOREIGN PATENT DOCUMENTS

| | | | | |
|---|---|---|---|---|
| JP | 2010267409 A | * 11/2010 | B41J 35/00 |
| JP | 2013-196431 A | 9/2013 | |

* cited by examiner

*Primary Examiner* — Howard J Sanders
(74) *Attorney, Agent, or Firm* — Rabin & Berdo, P.C.

(57) ABSTRACT

A medium processing device includes: a drum that is rotatably supported, that rotates around a rotation axis, and that winds a medium around a peripheral side surface thereof; a first tape that winds the medium sandwiched between the peripheral side surface and the first tape, accompanying rotation of the drum; a movable guide that is movable following a drum diameter of the drum, which changes depending on a winding amount of the medium, and that guides the medium; and a first static electricity elimination section that is provided at the movable guide, that abuts the first tape, and that performs static electricity elimination of an electric charge of the charged first tape.

14 Claims, 6 Drawing Sheets

MEDIUM PROCESSING DEVICE AND MEDIUM TRANSACTION DEVICE

CROSS-REFERENCE TO RELATED APPLICATIONS

This application is a continuation-in-part application of International Application No. PCT/JP2020/015710, filed on Apr. 7, 2020, which is incorporated herein by reference in its entirety. Further, this application claims priority from Japanese Patent Application No. 2019-100334, filed on May 29, 2019, the disclosure of which are incorporated by reference herein in their entirety.

BACKGROUND

Technical Field

The present disclosure relates to a medium processing device and a medium transaction device, and may be applied to, for example, an automatic teller machine (ATM) in which a medium such as a banknote is inserted to perform a desired transaction.

Related Art

In an automatic teller machine or the like used in a financial institution, a store or the like, a customer is allowed to deposit cash such as banknotes or coins, and cash is withdrawn to the customer, according to the contents of the transaction with the customer. As an automatic teller machine, there is an automatic teller machine that has a built-in banknote deposit/withdrawal machine that includes a deposit/withdrawal section that carries out giving and receiving of banknotes with customers, a classification section that classifies and discriminates denominations and authenticity of inserted banknotes and identifies serial numbers of the banknotes, a temporary holding section that temporarily holds the inserted banknotes, a transport section that transports the banknotes, and a banknote storage that stores the banknotes per each denomination.

As the temporary holding section, there is a temporary holding section that includes, for example, a rotating cylindrical drum, a tape having one end thereof fixed to a peripheral side surface of the drum, a reel on which the tape is wound, plural rollers that cause the tape to travel along a desired traveling path, and the like. The temporary holding section stores the banknotes by winding the banknotes, together with the tape, around the peripheral side surface of the drum, and peels off the banknotes, together with the tape, from the peripheral side surface to feed them out (refer to, for example, Japanese Patent Application Laid-Open (JP-A) No. 2013-196431).

In such a temporary holding section, when the banknotes are discharged by rewinding the tape, there is a possibility that static electricity will be generated between the rewound tape and the banknotes to charge the tape, and that discharge will occur after the tape is wound on the reel to cause the temporary holding section to break down. Therefore, in the temporary holding section, it is desirable to remove static electricity from the tape (that is to say, perform static electricity elimination) by, for example, causing a static electricity elimination bar to contact the tape that has been peeled off from the drum.

SUMMARY

A first aspect of the present disclosure is a medium processing device including: a drum that is rotatably supported, that rotates around a rotation axis, and that winds a medium around a peripheral side surface thereof; a first tape that winds the medium sandwiched between the peripheral side surface and the first tape, accompanying rotation of the drum; a movable guide that is movable following a drum diameter of the drum, which changes depending on a winding amount of the medium, and that guides the medium; and a first static electricity elimination section that is provided at the movable guide, that abuts the first tape, and that performs static electricity elimination of an electric charge of the charged first tape.

Further, a second aspect of the present disclosure is a medium transaction device including: an intake section that takes in, from an exterior, a medium to be transacted; a transport section that transports the medium; and the medium processing device according to the first aspect.

DETAILED DESCRIPTION

Hereinafter, embodiments for implementing the disclosure (hereinafter referred to as exemplary embodiments) will be described using the drawings.

[1. Configuration of Automatic Teller Machine]

Figure 1:
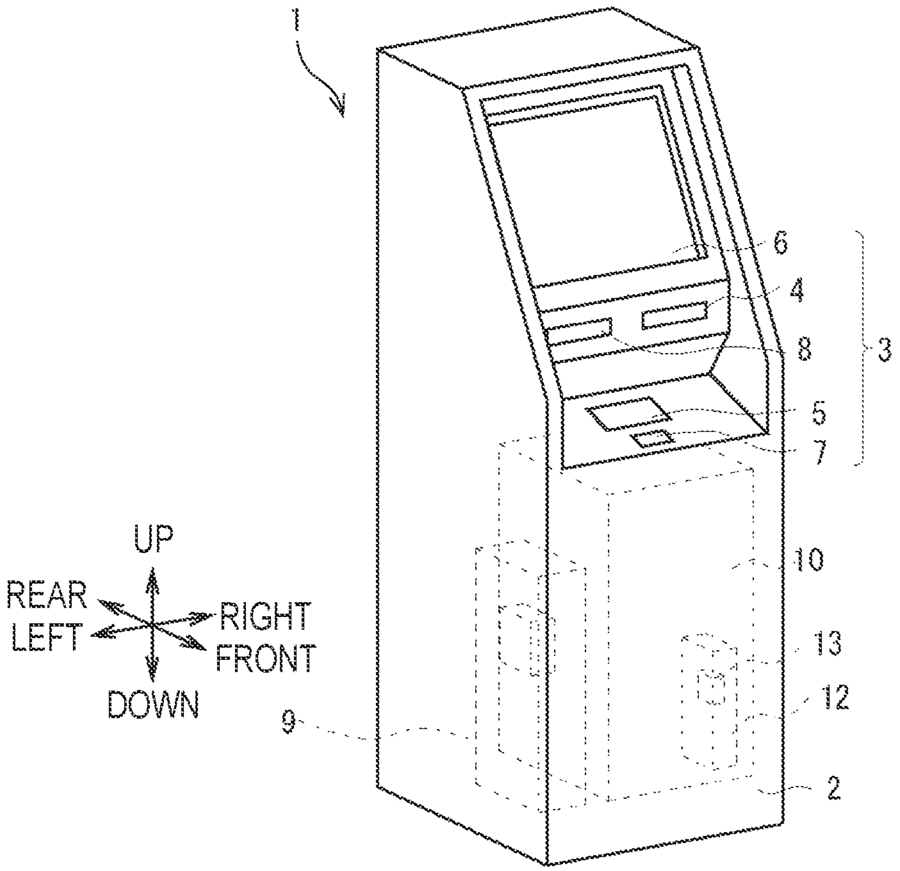
FIG. 1 is a perspective view showing a configuration of an automatic teller machine.

As shown in outward appearance in FIG. 1, an automatic teller machine (ATM) 1 is mainly configured by a box-shaped housing 2, is installed in, for example, a financial institution or the like, and carries out transactions relating to cash, such as a deposit transaction, a withdrawal transaction, or the like, with a customer. The housing 2 is provided with a customer service section 3 at a location on a front side thereof at which it is easy for the customer to insert a banknote, perform an operation by a touch panel, and the like, in a facing state.

The customer service section 3 is provided with a card inlet/outlet port 4, a deposit/withdrawal port 5, an operation display section 6, a numeric keypad 7, and a receipt issuance port 8, directly exchanges cash, passbooks and the like with the customer, and also carries out notification of information relating to transactions and receipt of operation instructions. The card inlet/outlet port 4 is a portion at which various cards such as cash cards or the like are inserted or ejected. A card processing section that carries out reading of account numbers and the like that are magnetically recorded on the various cards is provided at a back side of the card inlet/outlet port 4. The deposit/withdrawal port 5 is a portion at which banknotes to be deposited by the customer are inserted and banknotes to be withdrawn to the customer are discharged. The deposit/withdrawal port 5 is opened or closed by driving a shutter. The operation display section 6 integrates a liquid crystal display (LCD) that displays an operation screen at the time of a transaction and a touch panel for selecting a type of transaction and inputting a personal identification number, a transaction amount, or the like. The numeric keypad 7 comprises physical keys that receive input of numbers from “0” to “9” and the like, and is used at the time of an input operation of a personal identification number, a transaction amount, or the like. The receipt issuance port 8 is a portion that issues a receipt on which transaction details and the like are printed at the end of transaction processing. A receipt processing section for printing the transaction details and the like on the receipt is provided at a back side of the receipt issuance port 8.

Inside the housing 2, a main control unit 9 that integratedly controls the entire automatic teller machine 1, a banknote deposit/withdrawal machine 10 that carries out various processing related to banknotes, and the like are provided. The main control unit 9 is mainly configured by a central processing unit (CPU) and, by reading out a predetermined program from a storage section configured by a read only memory (ROM), a random access memory (RAM), a hard disk drive, a flash memory, or the like, and executing the program, the main control unit 9 controls the respective sections of the ATM 1 to carry out various processing such as deposit transactions, withdrawal transactions and the like.

The housing 2 is provided with doors that may be opened and closed on a front face side and a rear face side. By closing the doors during a transaction operation in which transaction processing with a customer is carried out, the housing 2 protects an interior of the automatic teller machine 1. On the other hand, during maintenance work in which maintenance work is carried out by a bank employee, a maintenance worker of a financial institution, or the like, by opening the doors of the housing 2 as necessary, work on respective sections at the interior can be easily carried out. In the following, explanation will be given with the side of the automatic teller machine 1 facing the customer being designated as a front side, with the opposite side being designated as a rear side, and with left, right, up, and down as viewed from the customer facing the front side being respectively designated as a left side, a right side, an upper side, and a lower side.

[2. Internal Configuration of Banknote Deposit/Withdrawal Machine]

Figure 2:
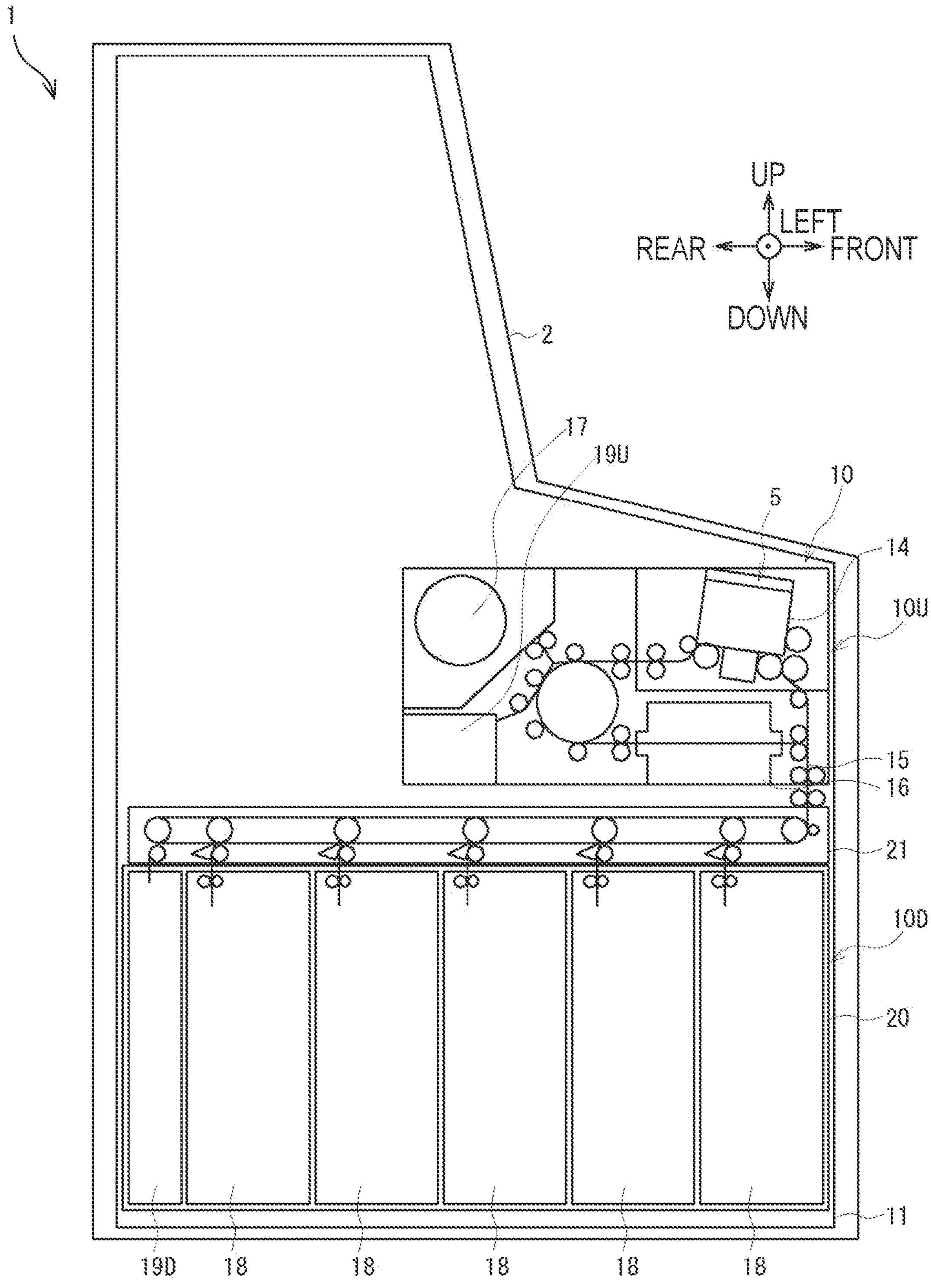
FIG. 2 is a left side view showing an internal configuration of an automatic teller machine.

As shown in FIG. 2, the banknote deposit/withdrawal machine 10 is roughly divided into an upper unit 10U that occupies an upper side portion above an approximate center in a vertical direction and a lower unit 10D that occupies a lower side portion thereof, and plural sections that carry out various processing related to banknotes are incorporated at the interior.

[2-1. Configuration of Upper Unit]

In the upper unit 10U, various mechanisms are fixed to a frame 11, and a banknote control unit 12 (FIG. 1) integratedly controls a deposit/withdrawal section 14, a transport section 15, a classification section 16, a temporary holding section 17, a banknote storage 18, an upper side reject storage 19U, and a lower side reject storage 19D.

The banknote control unit 12 (FIG. 1) is mainly configured by a CPU and, by reading out a predetermined program from a storage section 13 (FIG. 1) configured by a ROM, a RAM, a hard disk drive, a flash memory, or the like, and executing the program, the banknote control unit 12 controls the respective sections of the banknote deposit/withdrawal machine 10 to carry out various processing such as deposit transactions, withdrawal transactions, and the like. The storage section 13 stores a classification result of the classification section 16 discriminating a banknote, an identification result for a serial number of the banknote, and the like, together with transaction information.

The deposit/withdrawal section 14 is arranged at a front upper side of the banknote deposit/withdrawal machine 10, separates banknotes inserted by the customer one by one, and feeds them out to the transport section 15. A shutter is provided at the deposit/withdrawal port 5 (FIG. 1) of the deposit/withdrawal section 14. In the deposit/withdrawal section 14, when allowing the customer to insert banknotes at the time of a deposit transaction, and when delivering banknotes to the customer at the time of a withdrawal transaction, the deposit/withdrawal port 5 is opened by slidingly moving the shutter in a rear direction to attain a shutter open state. On the other hand, in the deposit/withdrawal section 14, in cases other than at the time of a deposit transaction or the time of a withdrawal transaction, by slidingly moving the shutter in a frontward direction to close the deposit/withdrawal port 5 and attain a shutter closed state, taking out of banknotes from the deposit/withdrawal section 14, mischief to the deposit/withdrawal section 14 from the exterior, and the like are prevented.

The transport section 15 transports rectangular banknotes in its lateral (short side) direction along a transport path indicated by a thick line in the drawings, by a roller, a belt, or the like. The transport section 15 transports banknotes so as to be inserted through the classification section 16 in a front-rear direction thereof, and respectively connects a rear side of the classification section 16 to the temporary holding section 17, the upper side reject storage 19U, and the deposit/withdrawal section 14. Further, the transport section 15 connects a front side of the classification section 16 to the deposit/withdrawal section 14, the banknote storage 18, and the lower side reject storage 19D. A selector is provided at a branch point of the transport section 15 and rotates based on control by the banknote control unit 12 (FIG. 1) to thereby switch a transport destination of a banknote.

The classification section 16 classifies and discriminates a denomination and authenticity of a banknote, as well as a degree of damage or the like (i.e., normalcy and/or damage), using an optical element, a magnetic detection element, or the like while transporting the banknote at an interior thereof, and notifies the classification result thereof to the banknote control unit 12. Further, the classification section 16 reads and identifies, from captured image data of the banknote, a serial number assigned per banknote and composed of alphanumeric characters or the like that are preprinted on one surface of the banknote. At this time, the classification section 16 notifies the identified characters to the banknote control unit 12 as an identification result. In response to this, the banknote control unit 12 determines the transport destination of the banknote based on the acquired classification result and the acquired identification result.

The temporary holding section 17 temporarily holds the banknotes that the customer has inserted into the deposit/withdrawal section 14 at the time of deposit, and temporarily holds depositable banknotes that have been discriminated as being depositable by the classification section 16 until the deposit is confirmed. On the other hand, deposit reject banknotes that have been discriminated as being non-depositable are discharged to the deposit/withdrawal section 14. Further, the temporary holding section 17 temporarily holds non-withdrawable banknotes that have been discriminated as being non-withdrawable by the classification section 16 at the time of withdrawal until withdrawable banknotes are withdrawn, and thereafter discharges the non-withdrawable banknotes to the upper side reject storage 19U.

The upper side reject storage 19U is formed in a rectangular parallelepiped shape and has a space for accumulating and storing banknotes at an interior thereof. When banknotes that have been determined, by the classification section 16 and the banknote control unit 12, to be banknotes that should not be reused, such as banknotes that have been discriminated as being damaged banknotes (so-called damaged bills), banknotes that have been discriminated as being counterfeit bills, banknotes of denominations that are not refluxed such as 5,000 yen bills and 2,000 yen bills, and the like, arrive transported by the transport section 15, the upper side reject storage 19U stores the banknotes at the interior thereof.

[2-2. Configuration of Lower Unit]

The lower unit 10D is provided with a lower frame 20 attached to the housing 2. Plural banknote storages 18 (for example, five in this embodiment) for storing reusable banknotes and a lower side reject storage 19D for storing banknotes that should not be reused are detachably provided at the lower frame 20.

In the lower unit 10D, a distribution transport section 21 is attached to upper surfaces of the five banknote storages 18 and the lower side reject storage 19D. The distribution transport section 21 uses plural types of transport path forming components, such as a transport motor, a sensor, a blade and the like, to transport reject banknotes and normal banknotes, which have been transported from the upper unit 10U, so as to appropriately switch a transport destination and distribute the banknotes to the lower side reject storage 19D and the banknote storages 18.

Within the lower frame 20, the five banknote storages 18 are provided in order from a front side to a rear side. Each banknote storage 18 is configured in the same manner, is formed in a rectangular parallelepiped shape that is long in the vertical direction, and has a space for accumulating and storing banknotes at the interior thereof. Each banknote storage 18 has a preset denomination of banknotes to be stored. At the banknote storage 18, when banknotes that have been determined, by the classification section 16 and the banknote control unit 12, to be reusable with a small degree of damage arrive transported by the transport section 15 according to the denomination thereof, the banknotes are collected and stored at the interior thereof. Further, when the banknote storage 18 receives an instruction from the banknote control unit 12 to feed out banknotes, the banknote storage 18 separates the accumulated banknotes one by one to feed them out and delivers them to the transport section 15.

The lower side reject storage 19D is located behind the banknote storages 18 within the lower frame 20, is formed in a rectangular parallelepiped shape that is long in the vertical direction, and has a space for accumulating and storing banknotes at the interior thereof. When banknotes that have been determined, by the classification section 16 and the banknote control unit 12, to be banknotes that should not be reused, such as banknotes that have been discriminated as being damaged banknotes (so-called damaged bills), banknotes that have been discriminated as being counterfeit bills, banknotes of denominations that are not refluxed such as 5,000 yen bills and 2,000 yen bills, and the like, arrive transported by the transport section 15, the lower side reject storage 19D stores the banknotes at the interior thereof.

In such a configuration, in the automatic teller machine 1, the main control unit 9 and the banknote control unit 12 control the respective sections based on the classification result, the identification result, and the like of the banknotes by the classification section 16, to carry out deposit processing, withdrawal processing, and the like of the banknotes.

[3. Configuration of Temporary Holding Section]

Figure 3A:
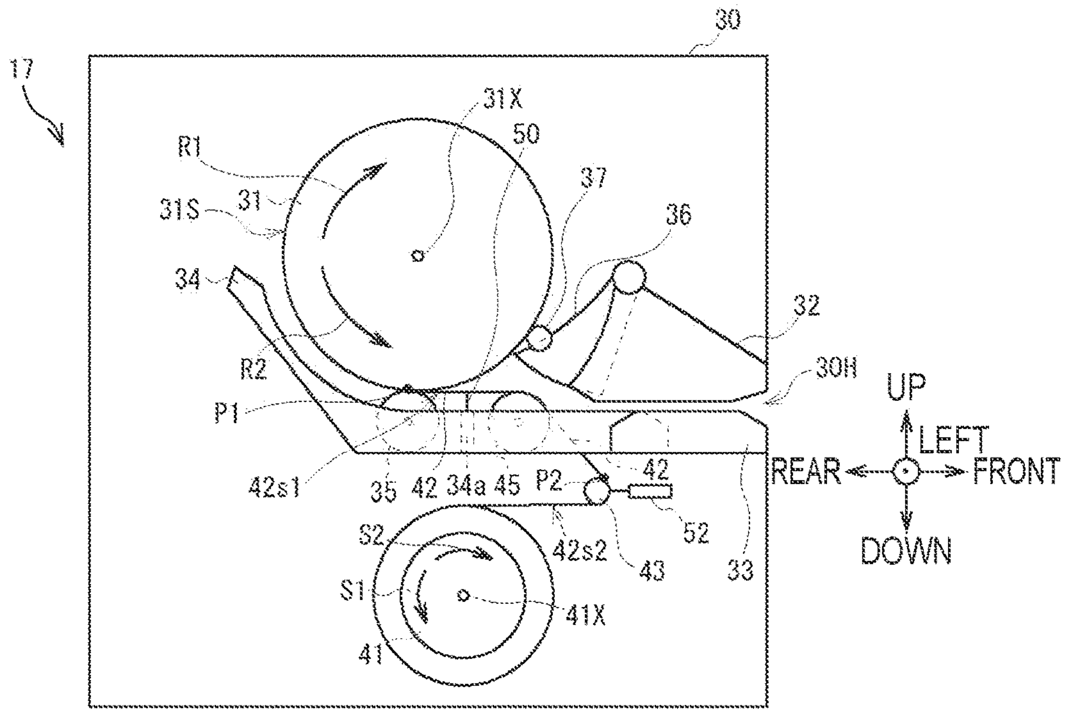
FIG. 3A is a left side view showing an internal configuration of a temporary holding section.
Figure 3B:
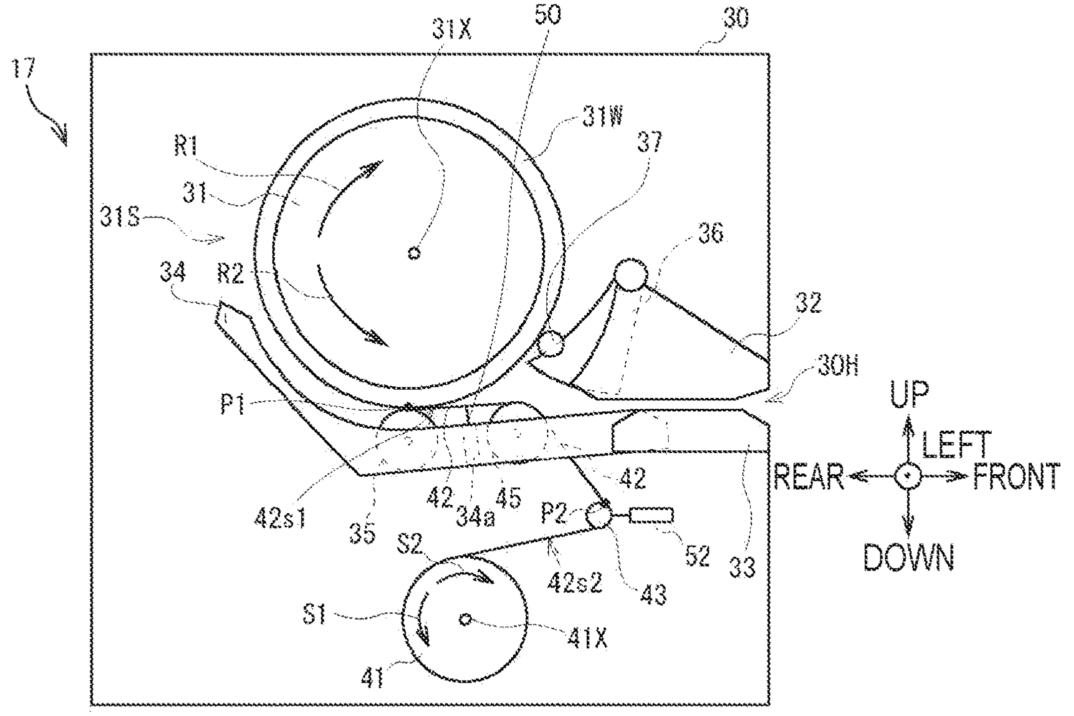
FIG. 3B is a left side view showing the internal configuration of the temporary holding section.
Figure 4:
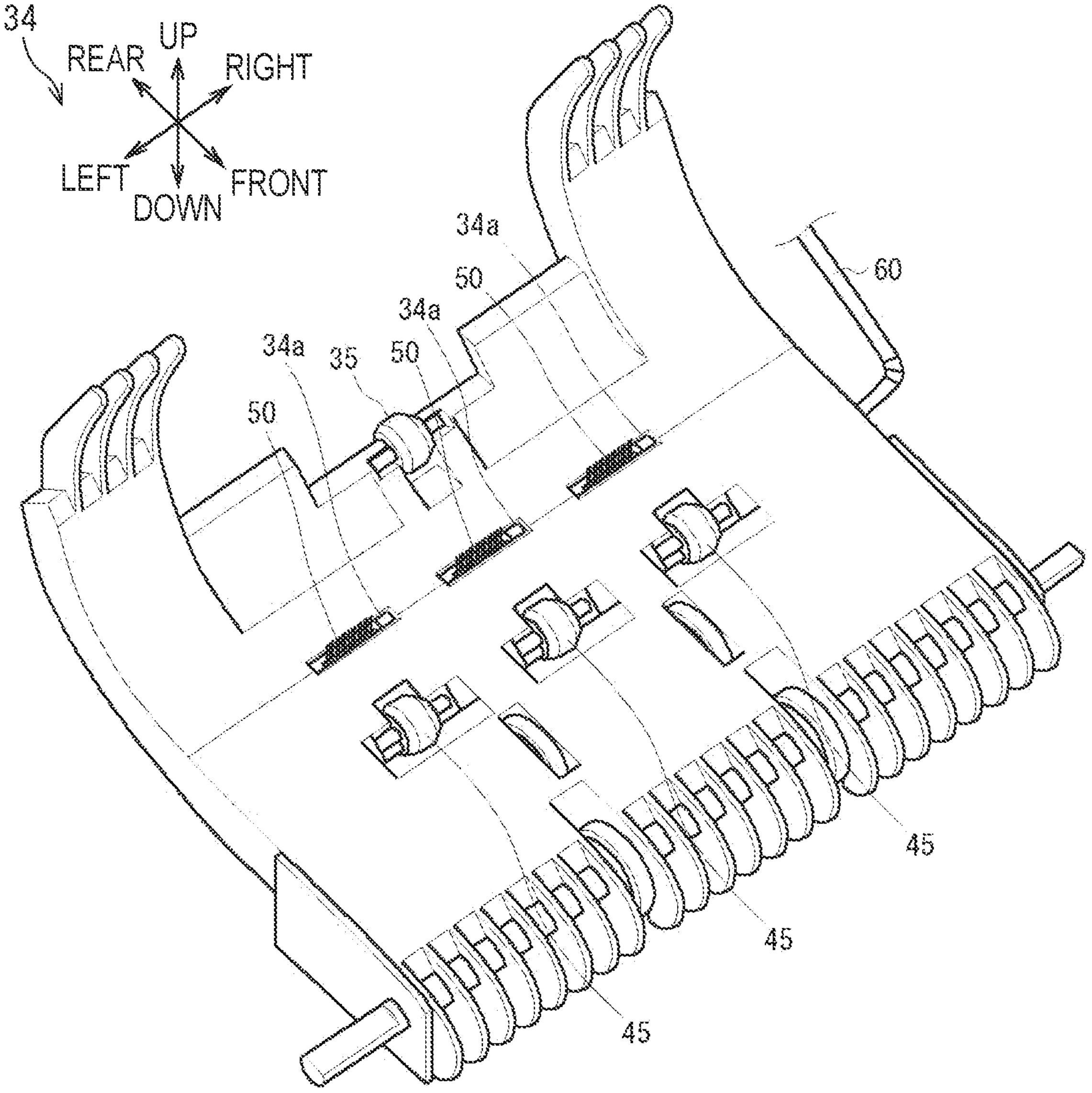
FIG. 4 is a perspective view showing a configuration of a lower side transport guide.
Figure 5:
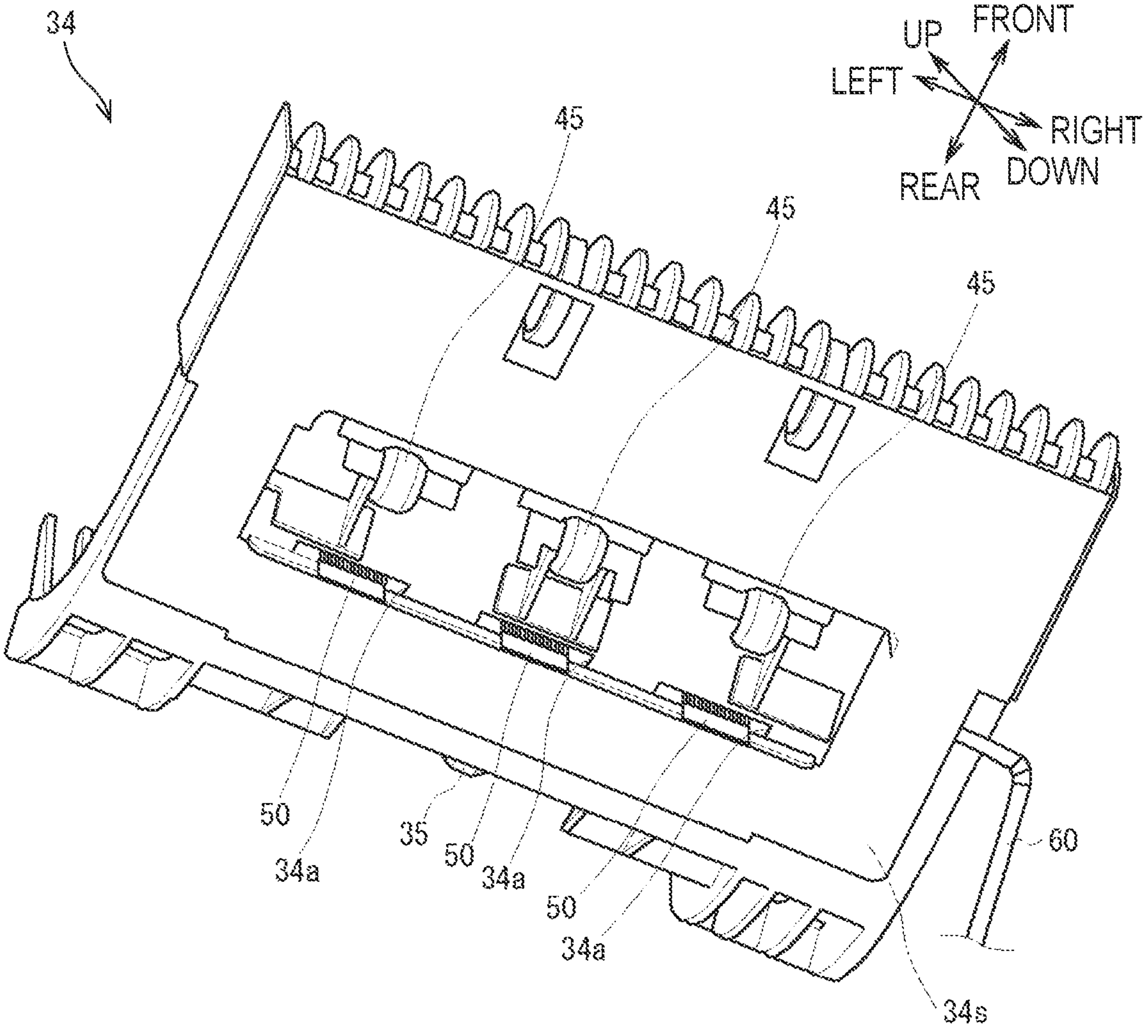
FIG. 5 is a perspective view showing a configuration of the lower side transport guide.

As shown in FIG. 3A and FIG. 3B, the temporary holding section 17, serving as a medium processing device, is covered by a temporary holding section frame 30, and respective parts are attached at an interior thereof. Note that FIG. 3A and FIG. 3B schematically show a left side view of the temporary holding section 17, and for convenience of explanation, some parts are illustrated to be transparent, omitted, or simplified. Further, the temporary holding section 17 is provided with three tape traveling systems configured in substantially the same manner as each other, at equal intervals in a left-right direction. In each tape traveling system, one tape 42 is made to travel.

A cylindrical drum 31 that rotates around a rotation axis 31X extending in the left-right direction, which is a transport width direction orthogonal to a transport direction in which banknotes are transported, is provided near an upper center within the temporary holding section frame 30. The drum 31 rotates in a winding direction R1 or a rewinding direction R2 due to a driving force being transmitted from a motor or the like. As will be described in detail later, when banknotes are wound around a peripheral side surface 31S of the drum 31, a winding layer 31W is formed at an outer periphery of the drum 31 as shown in FIG. 3B. At this time, the drum 31 has a larger apparent (or appearance) diameter, in which a thickness of the winding layer 31W has been added to a diameter of the drum 31, as compared with a thinnest state (FIG. 3A), which is a state in which banknotes have not been wound. Hereinafter, this apparent diameter is referred to as a drum diameter. Further, when banknotes are wound around the drum 31, an outermost periphery of the winding layer 31W is referred to as the peripheral side surface 31S. That is to say, as banknotes are wound around the drum 31, the drum diameter increases, and the peripheral side surface 31S moves away from the rotation axis 31X of the drum 31. Here, a state in which the drum diameter of the drum 31 is largest according to design, that is to say, a state in which a largest number of banknotes according to design are wound around the drum 31, is also referred to as a thickest state (FIG. 3B).

An insertion hole 30H for inserting banknotes is bored at a front surface of the temporary holding section frame 30. Behind the insertion hole 30H, an upper side transport guide 32 and a lower side transport guide 33 for respectively guiding the banknotes from above and below are provided. A lower surface of the upper side transport guide 32 is a substantially flat and substantially horizontal guide surface, and the upper side transport guide 32 is fixed to the temporary holding section frame 30. An upper surface of the lower side transport guide 33 is a substantially flat and substantially horizontal guide surface, and the lower side transport guide 33 is fixed to the temporary holding section frame 30 so as to form a gap of, for example, about 5 mm between the lower surface of the upper side transport guide 32 and the lower side transport guide 33. That is to say, the temporary holding section 17 guides the banknotes in the front-rear direction along the gap between the upper side transport guide 32 and the lower side transport guide 33. The upper side transport guide 32 and the lower side transport guide 33 are formed of, for example, a resin material.

Further, at a rear side of the lower side transport guide 33, a lower side movable guide 34 is provided so as to be located at a lower side of the drum 31. An upper surface of a front half portion of the lower side movable guide 34 is a flat guide surface configured such as if the upper surface of the lower side transport guide 33 has been extended. Further, an upper surface of a rear half portion of the lower side movable guide 34 is a guide surface that is curved along the peripheral side surface 31S of the drum 31. The lower side movable guide 34 is also formed of, for example, a resin material.

As shown in FIG. 3A, FIG. 3B, FIG. 4 and FIG. 5, one drum abutting roller 35 is provided at a substantial center in the left-right direction at a position further toward the rear than directly under the drum 31 in the rear half portion of the lower side movable guide 34. The drum abutting roller 35, serving as a pressing roller, has a substantially cylindrical shape extending in the left-right direction, and is rotatably supported by the lower side movable guide 34. A portion at an upper side of the drum abutting roller 35 projects upward from the upper surface of the lower side movable guide 34 and abuts the peripheral side surface 31S of the drum 31 at an abutting position P1. A front end portion of the lower side movable guide 34 is rotatably supported by a rear end portion of the lower side transport guide 33 and is biased in a direction of being pressed against the peripheral side surface 31S of the drum 31 by a torsion spring or the like. As a result, the lower side movable guide 34 is movable so as to follow the change in the drum diameter of the drum 31, and causes the drum abutting roller 35 to always abut the peripheral side surface 31S of the drum 31.

Further, at a substantially central portion between the drum abutting roller 35 and feed rollers 45, which will be described later, in the lower side movable guide 34, lower side movable guide static electricity elimination bar holes 34*a* (hereinafter also referred to as through holes) through which base portions of static electricity elimination bars 50, which will be described later, are inserted are bored so as to be lined up in the left-right direction and respectively face three tapes 42. The lower side movable guide static electricity elimination bar holes 34*a* penetrate the lower side movable guide 34 in the vertical direction, have lengths in the left-right direction that are larger than widths of the static electricity elimination bars 50, and accommodate the base portions of the static electricity elimination bars 50 at interiors thereof. In the static electricity elimination bars 50, three static electricity elimination bars 50 having the same configuration as each other (i.e., first, second and third static electricity bar) are arranged so as to be lined up in the left-right direction and respectively face the three tapes 42 (i.e., first, second and third tape), and leading end sides of the static electricity elimination bars 50 project toward the drum 31 and abut outer side surfaces 42*s*1 of the tapes 42, which are at a side away from the rotation axis 31X. The outer side surfaces 42*s*1 of the tapes 42 are surfaces opposite to the surfaces facing the banknotes fed from the drum 31, and are also referred to as second surfaces. That is, the static electricity elimination bars 50 abut the outer side surfaces 42*s*1 (i.e., the second surfaces) of the tapes 42.

Further, a lower side movable guide back surface sheet metal 34*s* is fixed to a lower surface, that is to say, a back surface, of the lower side movable guide 34. One end of a ground cord 60, serving as a conductive portion, which is a conductive cable, is connected to the lower side movable guide back surface sheet metal 34*s*. The other end of the ground cord 60 is connected to the temporary holding section frame 30. As a result, the lower side movable guide back surface sheet metal 34*s* is electrically connected with the temporary holding section frame 30 by the ground cord 60.

Further, below the drum 31, three spool-shaped reels 41 that rotate around a rotation axis 41X extending in the left-right direction are provided substantially in the center in the left-right direction. The reels 41 are formed so that lengths thereof in the left-right direction are sufficiently shorter than that of the drum 31. Further, the reels 41 rotate in a pull-out direction S2 or a winding direction S1 due to a driving force being transmitted from a motor or the like. One tape 42 is wound around each reel 41. Each tape 42 is, for example, a relatively soft resin material and is formed in an elongated thin film shape. Widths of the tapes 42 (i.e., lengths in the left-right direction) are slightly shorter than widths of the reels 41, and sufficiently shorter than a length of the drum 31 in the left-right direction. One ends of the tapes 42 are respectively fixed to the peripheral side surfaces of the reels 41.

Three rollers 43 that are rotatably supported by the temporary holding section frame 30 so that a central axis does not move are arranged in front of upper sides of the reels 41. Each roller 43, serving as a fixed roller, is formed of, for example, a resin material, has a substantially cylindrical shape extending in the left-right direction, and is formed so that a length thereof in the left-right direction is sufficiently shorter than that of the drum 31. Further, three feed rollers 45 are provided between the rollers 43 and the drum abutting roller 35 at the lower side movable guide 34. Each feed roller 45, serving as a movable roller, has a cylindrical shape extending in the left-right direction, and is rotatably supported by the lower side movable guide 34. In a similar manner as the drum abutting roller 35, a portion at an upper side of each feed roller 45 projects upward from the upper surface of the lower side movable guide 34. Further, each feed roller 45 is also formed so that a length thereof in the left-right direction is sufficiently shorter than that of the drum 31. Further, holes for passing the tapes 42 therethrough are respectively bored in front of the feed rollers 45. These hole penetrate the lower side movable guide 34 in the vertical direction, and lengths of the holes in the left-right direction are larger than the widths of the tapes 42. The drum abutting roller 35, the rollers 43, and the feed rollers 45 respectively have lengths in the left-right direction that are slightly longer than the lengths of the tapes 42 in the left-right direction (that is to say, the tape widths).

The tapes 42 that are wound around the reels 41 are pulled out from the reels 41 diagonally upward toward the front, and are then trained on the rollers 43 and folded back diagonally upward toward the rear. Further, the tapes 42 are trained on the upper portions of the feed rollers 45, head rearward, enter between the drum abutting roller 35 and the drum 31, are pressed against the peripheral side surface 31S of the drum 31 by the drum abutting roller 35, and are finally wound on the drum 31. Note that the leading ends of the tapes 42 are fixed to the peripheral side surface 31S of the drum 31.

Further, static electricity elimination bars 52 having the same configuration as each other are arranged in front of the rollers 43 so as to be lined up in the left-right direction and respectively face the three tapes 42. The static electricity elimination bars 52, serving as another (i.e., second) static electricity elimination section, have the same configuration as the static electricity elimination bars 50, base portions thereof are attached to the temporary holding section frame 30, and leading end portions thereof abut inner side surfaces 42*s*2, of the tapes 42 in a state of being wound on the rollers

43, which are surfaces at a reverse side from the outer side surfaces 42*s*1 and at the side closer to the rotation axis 31X. In other words, the inner side surfaces 42*s*2 of the tapes 42 are surfaces that do not contact the banknotes fed from the drum 31, and are also referred to as first surfaces. That is, the static electricity elimination bars 52 abut the inner side surfaces 42*s*2 (i.e., the first surfaces) of the tapes 42 that are opposite to the outer side surfaces 42*s*1 of the tapes 42.

In the temporary holding section 17, by rotating the drum 31 in the winding direction R1, the tapes 42 are caused to travel along the above-described path while the tapes 42 are pulled by the drum 31, and the tapes 42 are wound on the peripheral side surface 31S of the drum 31. Further, in the temporary holding section 17, by rotating the reels 41 in the winding direction S1 and rotating the drum 31 in the rewinding direction R2, the tapes 42 are peeled off from the peripheral side surface 31S of the drum 31 and caused to travel along the above-described path in the reverse direction, to wind the tapes 42 on the reels 41. Therefore, tension acts on the tapes 42 at all locations on the path.

In the temporary holding section 17, when banknotes are stored, the drum 31 is rotated in the winding direction R1 to cause the tapes 42 to travel, banknotes entering from the insertion hole 30H are transported rearward along the gap between the upper side transport guide 32 and the lower side transport guide 33, and the banknotes are wound on the peripheral side surface 31S by the tapes 42 accompanying rotation of the drum 31. At this time, due to the lower side movable guide 34 being movable following the change in the drum diameter, the drum abutting roller 35 is always caused to abut the peripheral side surface 31S.

On the other hand, at the time of feeding out of the banknotes, in the temporary holding section 17, by rotating the reels 41 in the winding direction S1 and rotating the drum 31 in the rewinding direction R2 to cause the tapes 42 to travel in the reverse direction from that at the time of storage, the banknotes that are wound on the drum 31 are peeled off from the drum 31 together with the tapes 42 at the abutting position P1. The banknotes that have been peeled off from the drum 31 are transported frontward, further transported frontward along a transport direction along the gap between the upper side transport guide 32 and the lower side transport guide 33, and are fed out from the insertion hole 30H.

In this way, in the temporary holding section 17, since the lower side movable guide 34 is movable following the change in the drum diameter, the drum abutting roller 35 and the feed rollers 45, which are supported by the lower side movable guide 34, are also movable. On the other hand, the rotation axis of the rollers 43 does not move regardless of the change in the drum diameter. Therefore, in the temporary holding section 17, the trajectory of the tapes 42 between the abutting position P1 and a winding position P2, which is a location at which the tapes 42 heading from the drum 31 toward the rollers 43 start to wind around the rollers 43, will change according to the drum diameter. At the location at which the tapes 42 are wound around the rollers 43, the trajectory of the tapes 42 does not change according to the drum diameter. Further, the trajectory of the tapes 42 from the location at which the tapes 42 separate from the rollers 43 to the location at which the tapes 42 start to wind around the reels 41 changes according to the drum diameter.

In addition to the above-described configuration, the temporary holding section 17 is provided with an upper side movable guide 36 at the rear side of the upper side transport guide 32. A rear surface of the upper side movable guide 36 (that is to say, a surface facing the drum 31) is curved along the peripheral side surface 31S of the drum 31. Following rollers 37 are rotatably supported by the upper side movable guide 36 near lower ends of the outer side surfaces, respectively. A portion at a rear side of each following roller 37 projects rearward from a rear surface of the upper side movable guide 36 and abuts the peripheral side surface 31S of the drum 31.

Further, an upper end portion of the upper side movable guide 36 is rotatably supported by an upper end of a rear end portion of the upper side transport guide 32 and is biased in a direction of being pressed against the peripheral side surface 31S of the drum 31 by a spring. As a result, the upper side movable guide 36 is movable so as to follow the change in the drum diameter of the drum 31, and causes the following rollers 37 to always abut the peripheral side surface 31S of the drum 31.

The temporary holding section 17 has the upper side movable guide 36 as described above. As a result, in the temporary holding section 17, when a banknote immediately after being peeled off from the drum 31 is transported to the gap between the upper side transport guide 32 and the lower side transport guide 33, even if, for example, the banknote has an inclination to fold such that both ends thereof are lifted up, bending of the banknote is suppressed by the upper side movable guide 36 that is positioned above the banknote, and the banknote may be guided to the gap between the upper side transport guide 32 and the lower side transport guide 33 from the peripheral side surface 31S of the drum 31 without being caught on a rear surface of the upper side transport guide 32 or the like.

[4. Configuration of Static Electricity Elimination Bars]

Figure 6A:
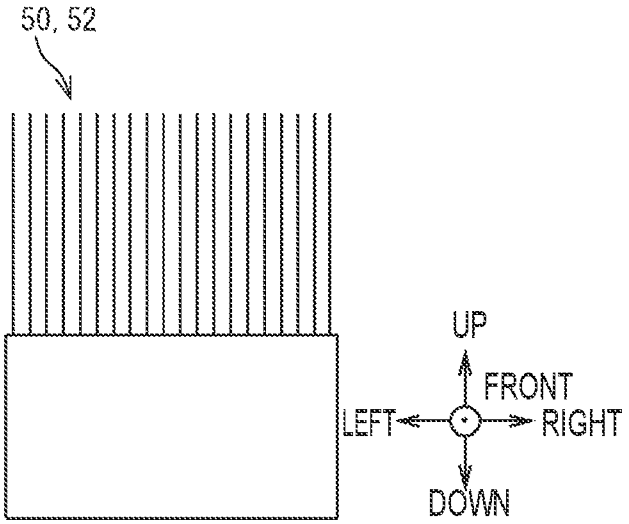
FIG. 6A is a front view showing a configuration of a static electricity elimination bar.
Figure 6B:
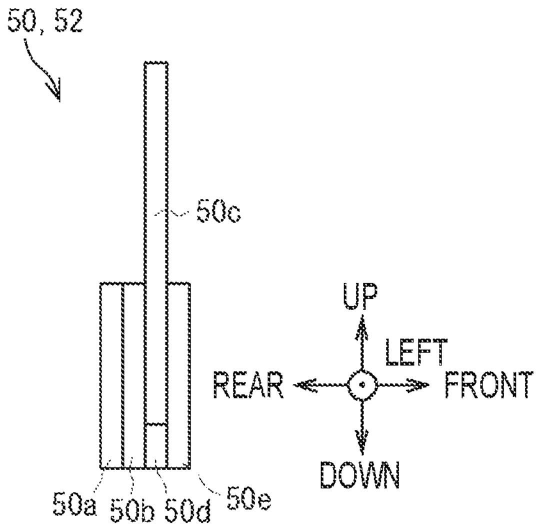
FIG. 6B is a left side view showing the configuration of the static electricity elimination bar.

Since the static electricity elimination bars 50 and the static electricity elimination bars 52 are configured in the same manner as each other, only the static electricity elimination bars 50 will be described below. The static electricity elimination bars 50 are configured such that the static electricity elimination bars 50 having the same configuration as each other are arranged so as to be lined up in the left-right direction and respectively face the three tapes 42. As shown in FIG. 6A and FIG. 6B, each static electricity elimination bar 50 is configured by an insulating sheet 50*a*, an adhesive 50*b*, electrodes 50*c*, a removal prevention adhesive 50*d*, and a conductive double-sided tape 50*e*. The electrodes 50*c* are conductive stainless steel fibers extending along a longitudinal direction, and plural electrodes 50*c* are arranged along a width direction of the static electricity elimination bar 50, which is the left-right direction. The insulating sheet 50*a* is provided at one direction side in a thickness direction orthogonal to the width direction with respect to the electrodes 50*c*, and has a length in the longitudinal direction of about half a length of the electrodes 50*c* in the longitudinal direction. The insulating sheet 50*a* is arranged at a base side of the electrodes 50*c*, and electrically insulates the one direction side of the electrodes 50*c* in the thickness direction from an exterior. The adhesive 50*b* is applied between the electrodes 50*c* and the insulating sheet 50*a* and adheres the insulating sheet 50*a* to the electrodes 50*c*. The conductive double-sided tape 50*e* is attached to the electrodes 50*c* at the other direction side in the thickness direction with respect to the electrodes 50*c*, and has a length in the longitudinal direction of about half of the length of the electrodes 50*c* in the longitudinal direction. The conductive double-sided tape 50*e* is arranged at the base side of the electrodes 50*c*, physically adheres the other direction side of the electrodes 50*c* in the thickness direction to the exterior, and makes the other direction side of the electrodes 50*c* in the thickness direction electrically conductively continuous with the exterior. The removal prevention adhesive 50*d* is applied to the base side of the electrodes 50*c* and prevents the electrodes 50*c* from slipping out from between the adhesive 50*b* and the conductive double-sided tape 50*e*.

The base portions of the static electricity elimination bars 50 are respectively inserted through the lower side movable guide static electricity elimination bar holes 34*a* of the lower side movable guide 34, and the conductive double-sided tapes 50*e* are attached to the lower side movable guide back surface sheet metal 34*s*. Therefore, the base sides of the electrodes 50*c* of the static electricity elimination bars 50 are conductively continuous with the lower side movable guide back surface sheet metal 34*s*, and leading end sides thereof protrude toward the drum 31 and abut the outer side surfaces 42*s*1 of the tapes 42, which are at the side away from the rotation axis 31X, between the abutting position P1 and winding position P2.

[5. Static Electricity Elimination]

In the above described configuration, the reels 41 rotate in the winding direction 51, the drum 31 rotates in the rewinding direction R2, and the tapes 42 are peeled off from the peripheral side surface 31S of the drum 31. When the outer side surfaces 42*s*1 of the tapes 42 come into contact with the electrodes 50*c* of the static electricity elimination bars 50, electric charges move from the outer side surfaces 42*s*1 of the tapes 42 to the lower side movable guide back surface sheet metal 34*s* via the electrodes 50*c* and the conductive double-sided tapes 50*e*, and further move to the temporary holding section frame 30 via the ground cord 60. Therefore, static electricity charged on the outer side surfaces 42*s*1 of the tapes 42 is discharged to the frame 11 via the static electricity elimination bars 50, the lower side movable guide back surface sheet metal 34*s*, the ground cord 60, and the temporary holding section frame 30. As a result, the outer side surfaces 42*s*1 of the tapes 42 undergo static electricity elimination.

As described above, when the drum diameter changes, the trajectory of the tapes 42 between the abutting position P1 and the winding position P2 changes. That is to say, in the thinnest state (FIG. 3A), the trajectory of the tapes 42 between the abutting position P1 and the winding position P2 passes through a position at an upper side so as to be closest to the rotation axis 31X of the drum 31. In contrast, in the thickest state (FIG. 3B), the trajectory of the tapes 42 between the abutting position P1 and the winding position P2 passes through a position at a lower side so as to be farthest away from the rotation axis 31X of the drum 31.

Since the lower side movable guide 34 is movable following the change in the drum diameter, the static electricity elimination bars 50 attached to the lower side movable guide 34 are also movable. That is to say, the static electricity elimination bars 50 gradually move toward the upper side so as to approach the drum 31 accompanying transitioning from the thickest state (FIG. 3B) to the thinnest state (FIG. 3A), while the static electricity elimination bars 50 gradually move toward the lower side so as to move away from the drum 31 accompanying transitioning from the thinnest state (FIG. 3A) to the thickest state (FIG. 3B).

Therefore, the temporary holding section 17 may make the static elimination bars 50 movable following the change in the trajectory of the tapes 42. As a result, the temporary holding section 17 may keep a distance between the base portions of the static electricity elimination bars 50 and the tapes 42 constant, and continue to cause the leading end portions of the electrodes 50*c* of the static electricity elimination bars 50 to contact the outer side surfaces 42*s*1 of the tapes 42 with a constant force, regardless of the drum diameter.

Further, the inner side surfaces 42*s*2 of the tapes 42 come into contact with the electrodes 50*c* of the static electricity elimination bars 52. At this time, the electric charges move from the inner side surfaces 42*s*2 of the tapes 42 to the temporary holding section frame 30 via the electrodes 50*c* and the conductive double-sided tapes 50*e*. Therefore, the static electricity charged on the inner side surfaces 42*s*2 of the tapes 42 is discharged to the frame 11 via the static electricity elimination bars 52 and the temporary holding section frame 30. As a result, the inner side surfaces 42*s*2 of the tapes 42 undergo static electricity elimination.

Here, since the position of the rollers 43 does not change according to the drum diameter, the trajectory of the tapes 42 in the state of being wound around the rollers 43 does not change according to the drum diameter. Therefore, by causing the static electricity elimination bars 52, which are not movable according to the drum diameter, to abut the inner side surfaces 42*s*2 of the tapes 42, the temporary holding section 17 may perform static electricity elimination on the inner side surfaces 42*s*2 of the tapes 42 regardless of the change in the drum diameter. That is, since the static electricity elimination bars 52 abut the inner side surfaces 42*s*2 of the tapes 42 at locations where the tapes 42 abut the rollers 43, the static electricity elimination bars 52 may perform static electricity elimination on the tapes 42 without being affected by the change in the drum diameter.

In this way, the temporary holding section 17 is configured to cause the static electricity elimination bars 50, which are supported by the lower side movable guide 34 and are movable following the drum diameter, to abut the outer side surfaces 42*s*1 of the tapes 42, which have been peeled off from the drum 31, to perform static electricity elimination. Further, the temporary holding section 17 is configured to cause the static electricity elimination bars 52, which are fixed to the temporary holding section frame 30 and are not movable following the drum diameter, to abut the inner side surfaces 42*s*2 of the tapes 42, which have been peeled off from the drum 31, to perform static electricity elimination. As a result, the temporary holding section 17 may perform static electricity elimination on both side surfaces of the tapes 42 that have been peeled off from the drum 31, and may prevent malfunction of and damage to the temporary holding section 17 due to static electricity.

[6. Operation and Effects]

In the above configuration, the temporary holding section 17 is provided with the static electricity elimination bars 50 at the lower side movable guide 34 that is movable following the drum diameter of the drum 31, which changes depending on the winding amount of the banknotes, and is configured to cause the static electricity elimination bars 50 to abut the outer side surfaces 42*s*1 of the tapes 42. Therefore, the temporary holding section 17 moves the static electricity elimination bars 50 to follow the trajectory of the tapes 42, which changes depending on the winding amount of the banknotes, causes the static electricity elimination bars 50 to stably contact the tapes 42 regardless of the winding amount of the banknotes, and may perform static electricity elimination on the outer side surfaces 42*s*1 of the tapes 42.

Further, the temporary holding section 17 is provided with the static electricity elimination bars 50 on the reverse side from the banknotes with the tapes 42 sandwiched between the static electricity elimination bars 50 and the banknotes that are fed out from the drum 31 rotating in the rewinding direction R2. Therefore, the temporary holding section 17 may cause the static electricity elimination bars 50 to contact the outer side surfaces **42*s*1 of the tapes 42 without contacting the transported banknotes, and may perform static electricity elimination on the outer side surfaces 42*s*1 of the tapes 42** while preventing the transport performance from being affected.

Here, it is also conceivable to provide rollers, other than the rollers 43, that are rotatably supported by the temporary holding section frame 30 so that a central axis thereof does not move, to thereby form a location at which the trajectory of the tapes 42 does not change according to the drum diameter between these rollers and the rollers 43, and cause static electricity elimination bars to contact this location. However, in that case, since it would be necessary to add rollers, the number of parts would increase, making it difficult to reduce the size of the temporary holding section 17 and also making it difficult to reduce the cost.

In contrast, the temporary holding section 17 is provided with the static electricity elimination bars 50 at the lower side movable guide 34 and configured so as to move the static electricity elimination bars 50 following the trajectory of the tapes 42. Therefore, the temporary holding section 17 may perform static electricity elimination on the outer side surfaces **42*s*1 of the tapes 42 while preventing the number of parts from increasing by not separately adding rollers for forming a location at which the trajectory of the tapes 42** does not change according to the drum diameter.

Further, it is also conceivable to configure the rollers 43 as rollers made of metal, and to perform static electricity elimination on the outer side surfaces **42*s*1 of the tapes 42 at these rollers 43 when the tapes 42 are wound around the rollers 43**. However, in a case in which rollers made of metal are used, bearings or the like are also required, which increases the complexity of the configuration and makes it difficult to reduce the cost.

In contrast, the temporary holding section 17 is configured such that the rollers 43 are made of resin, and such that the static electricity elimination bars 50, for which the cost is cheaper than in the case of configuring the rollers 43 as metal rollers, are added. As a result, the temporary holding section 17 may perform static electricity elimination on the outer side surfaces **42*s*1 of the tapes 42** without using metal rollers, and may avoid increasing the complexity of the configuration and reduce the cost, as compared with the case of using metal rollers.

According to the above configuration, the automatic teller machine 1 is provided with the deposit/withdrawal section 14 that takes in, from an exterior, banknotes, which are paper-sheet like media to be transacted, the transport section 15 that transports the banknotes, the drum 31 that is rotatably supported, that rotates around the rotation axis 31X, and that winds the banknotes around the peripheral side surface 31S thereof, the tapes 42 that wind the banknotes sandwiched between the peripheral side surface 31S and the tapes 42 accompanying rotation of the drum 31, the lower side movable guide 34 that is movable following the drum diameter of the drum 31, which changes depending on the winding amount of the banknotes, and that faces the drum 31 to guide the banknotes between the peripheral side surface 31S and the lower side movable guide 34, and the static electricity elimination bars 50 that are provided at the lower side movable guide 34, that abut the outer side surfaces **42*s*1 of the tapes 42, which are at the side away from the rotation axis 31X of the drum 31, and that discharge electric charges that have been transferred from the charged tapes 42**.

As a result, the automatic teller machine 1 moves the static electricity elimination bars 50 following the trajectory of the tapes 42, which changes depending on the winding amount of the banknotes, and may cause the static electricity elimination bars 50 to contact the tapes 42 to perform static electricity elimination on the tapes 42, regardless of the winding amount of the banknotes.

The temporary holding section 17 may eliminate the possibility of performing inappropriate static electricity elimination due to the apparent diameters of the reel 41 and the drum 31 corresponding to the winding amount of the tapes 42 wound thereon changing, and the distances between the static electricity elimination bars 50 and the tapes 42 being too near or too far due to the trajectory of the tapes 42 varying according to the winding amount of the tapes 42. Reliability of the temporary holding section 17 may thereby be improved.

[7. Other Embodiments]

In the above-described embodiment, a case in which static electricity elimination is performed on the tapes 42 by the static electricity elimination bars 50 has been described. The present disclosure is not limited to this, and static electricity elimination may be performed on the tapes 42 by various other static electricity elimination sections having conductivity.

Further, in the above-described embodiment, a case in which the static electricity elimination bars 50 are fixed to the lower side movable guide 34 has been described. The present disclosure is not limited to this, and the static electricity elimination bars 50 may be provided so as to be movable together with the lower side movable guide 34 so as to follow the trajectory of the tapes 42, which changes depending on the winding amount of the banknotes around the drum 31.

Further, in the above-described embodiment, a case in which the static electricity elimination bars 50 are caused to abut the tapes 42 between the abutting position P1 and the winding position P2 has been described. The present disclosure is not limited to this, and the static electricity elimination bars may be caused to abut the tapes 42 between the winding position P2 and the rollers 43.

Further, in the above-described embodiment, a case in which the static electricity elimination bars 50 are caused to abut the outer side surfaces **42*s*1 of the tapes 42 that have been peeled off from the drum 31 has been described. The present disclosure is not limited to this, and the static electricity elimination bars 50 may be caused to abut the outer surfaces 42*s*1 of the tapes 42 before being peeled off from the drum 31**.

Further, in the above-described embodiment, a case in which the static electricity elimination bars 52 are fixed to the temporary holding section frame 30 has been described. The present disclosure is not limited to this, and the static electricity elimination bars 52 may be fixed to a movable mechanism.

Further, the ground cord 60 may be arranged at various locations such as the vicinity of the torsion spring, the vicinity of a rotation fulcrum at the front end of the lower side movable guide 34, or the like.

Further, in the above-described embodiment, a case in which the rollers 43 are formed of a resin material has been described. The present disclosure is not limited to this, and the rollers 43 may be formed of various materials other than a metal material.

Further, in the above-described embodiment, a case in which the present disclosure is applied to the temporary holding section 17 having the three tapes 42 has been described. The present disclosure is not limited to this, and the present disclosure may be applied to a temporary holding section having any number of tapes such as one tape, two tapes, or four or more tapes.

Further, in the above-described embodiment, a case in which the present disclosure is applied to the automatic teller machine 1 for carrying out transactions with cash has been described. The present disclosure is not limited to this, and the present disclosure may be applied to various devices that handle thin paper-like media such as, for example, gift certificates, cash vouchers, admission tickets, and the like. Further, the present disclosure may be applied to a cash processing device configured by a combination of plural types of devices for carrying out various processing related to transaction of banknotes and coins, such as, for example, banknote deposit/withdrawal machines for depositing and withdrawing banknotes, sealed small bundle payment machines for sealing banknotes per a predetermined numbers of sheets, or the like.

Further, in the above-described embodiment, a case in which the automatic teller machine 1 serving as the automatic teller machine is configured by the deposit/withdrawal section 14 serving as the intake section, the transport section 15 serving as the transport section, the drum 31 serving as the drum, the tapes 42 serving as the tape, the lower side movable guide 34 serving as the movable guide, and the static electricity elimination bars 50 serving as the static electricity elimination section has been described. The present disclosure is not limited to this, and the medium transaction device may be configured by an intake section, a transport section, a drum, a tape, a movable guide, and a static electricity elimination section having various other configurations.

The technology of the present disclosure may also be used in various devices that protect electronic devices and the like from static electricity.

What is claimed is:

1. A medium processing device, comprising:

a drum that is rotatably supported, that rotates around a rotation axis, and that winds a medium around a peripheral side surface thereof;

a first tape that, accompanying rotation of the drum, supports the medium while being wound onto and around the peripheral side surface of the drum by sandwiching the medium with the peripheral side surface;

a movable guide configured to movably guide the medium so as to follow an outer diameter of the drum defined by the peripheral side surface and any of the first tape and medium wound thereon, the outer diameter changing as the first tape and medium are wound onto or rewound from the peripheral side surface of the drum;

a pressing roller rotatably attached to the movable guide at a location adjacent to the drum where the first tape is separated from the peripheral side surface of the drum, the pressing roller being biased toward the drum so as to press the first tape toward the drum;

a movable roller rotatably attached to the movable guide at a location away from the drum so as to convey the first tape by rotating the movable roller as the drum rotates; and a first static electricity elimination section attached at a through hole of the movable guide, between the movable roller and the pressing roller, the first static electricity elimination section being arranged such that a portion thereof projects out through the through hole from the movable guide and abuts the first tape so as to eliminate static electricity from the first tape.

2. The medium processing device according to claim 1, wherein:

the drum is configured to be rotatable in a winding direction for winding the first tape and in a rewinding direction for rewinding the first tape, and the first static electricity elimination section abuts the first tape that has separated from the peripheral side surface of the drum as a result of the drum rotating in the rewinding direction.

3. The medium processing device according to claim 2, wherein:

the first static electricity elimination section abuts the first tape between a location at which the first tape separates from the peripheral side surface of the drum and a location at which the first tape and the movable roller abut each other.

4. The medium processing device according to claim 1, wherein:

the first tape comprises a first surface that contacts the medium fed from the drum and a second surface that is opposite to the first surface, and the first static electricity elimination section abuts the second surface of the first tape.

5. The medium processing device according to claim 1, further comprising:

a reel on which the first tape is pre-wound, and from which the first tape is pulled out accompanying rotation of the drum;

a fixed roller that is provided to rotate on a trajectory of the first tape between the drum and the reel, and that winds the first tape that has separated from the peripheral side surface of the drum; and a second static electricity elimination section that is provided at a vicinity of the fixed roller and abuts a first surface of the first tape that is opposite to a second surface of the first tape, which the first static electricity elimination section abuts, so as to eliminate static from the first tape.

6. The medium processing device according to claim 5, wherein the second static electricity elimination section abuts the first tape at a location where the first tape abuts the fixed roller.

7. The medium processing device according to claim 5, wherein the fixed roller is formed from a material other than metal.

8. The medium processing device according to claim 1, wherein the first static electricity elimination section is a conductive member having one end side conductively continuous with a predetermined metal member and another end side protruding toward the drum.

9. The medium processing device according to claim 1, further comprising a conductive portion and a conductive frame that is electrically connected to the conductive portion, the conductive frame housing the drum and the movable guide therein, wherein the first static electricity elimination section is electrically connected to the conductive portion, and the static electricity discharged from the first tape by the first static electricity elimination section is discharged to the conductive frame through the conductive portion.

10. The medium processing device according to claim 1, wherein:

the medium processing device further comprises a second tape, the movable guide comprises a second static electricity elimination section, the first static electricity elimination section is provided so as to abut the first tape to eliminate static electricity from the first tape, and the second static electricity elimination section is provided so as to abut the second tape to eliminate static electricity from the second tape.

11. The medium processing device according to claim 10, further comprising a third tape, wherein:

the movable guide comprises a third static electricity elimination section, and the third static electricity elimination section is provided so as to abut the third tape to eliminate static electricity from the third tape.

12. A medium transaction device comprising:

an intake section that takes in, from an exterior, a medium to be transacted;

a transport section that transports the medium; and the medium processing device according to claim 1.

13. The medium processing device according to claim 1, wherein the movable guide is made of a resin material, the movable guide further comprises a back surface sheet metal at a back side thereof, and the first static electricity elimination section inserted into the through hole is attached to the back surface sheet metal of the movable guide.

14. The medium processing device according to claim 1, wherein a position of the first static electricity elimination section attached to the movable guide at the through hole thereof is changed while the movable guide guides the medium during the drum rotating such that the first static electricity elimination section remains abutting the first tape.

* * * * *